United States Patent
Uemura et al.

(10) Patent No.: US 7,595,635 B2
(45) Date of Patent: Sep. 29, 2009

(54) SMALL SIZE MAGNETIC ENCODER UNIT WITH LOW POWER CONSUMPTION

(75) Inventors: Koji Uemura, Fukuoka (JP); Yuji Arinaga, Fukuoka (JP); Takefumi Kabashima, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 205 days.

(21) Appl. No.: 11/629,302

(22) PCT Filed: May 11, 2005

(86) PCT No.: PCT/JP2005/008598

§ 371 (c)(1),
(2), (4) Date: May 23, 2007

(87) PCT Pub. No.: WO2005/124285

PCT Pub. Date: Dec. 29, 2005

(65) Prior Publication Data

US 2008/0054886 A1 Mar. 6, 2008

(30) Foreign Application Priority Data

Jun. 16, 2004 (JP) .............................. 2004-178124

(51) Int. Cl.
G01B 7/30 (2006.01)

(52) U.S. Cl. .............................. 324/207.25; 324/207.2; 324/207.21

(58) Field of Classification Search .............. 324/207.2, 324/207.21, 207.25
See application file for complete search history.

(56) References Cited

U.S. PATENT DOCUMENTS

| | | | | |
|---|---|---|---|---|
| 5,313,159 A | * | 5/1994 | Allwine, Jr. .............. | 324/207.2 |
| 5,430,373 A | * | 7/1995 | Ichikawa et al. ....... | 324/207.21 |
| 5,646,523 A | * | 7/1997 | Kaiser et al. ............. | 324/207.2 |
| 6,433,536 B1 | * | 8/2002 | Yundt et al. ............ | 324/207.22 |
| 6,542,088 B1 | * | 4/2003 | Bielski et al. .................. | 341/15 |
| 6,762,897 B1 | * | 7/2004 | Kabashima et al. ........ | 360/72.1 |
| 7,292,028 B2 | * | 11/2007 | Hahn .................... | 324/207.25 |

FOREIGN PATENT DOCUMENTS

DE 9302758 U1 5/1994

(Continued)

OTHER PUBLICATIONS

German Office Action dated Aug. 18, 2008.
Chinese Office Action dated Dec. 19, 2008.

*Primary Examiner*—Jay M Patidar
(74) *Attorney, Agent, or Firm*—Sughrue Mion, PLLC (57) ABSTRACT

A magnetic encoder unit with a small size and low power consumption is provided which can detect an angle in not more than one-turn and an amount of multi-turn.

The magnetic encoder unit includes a permanent magnet 2 magnetized in a direction perpendicular to a rotation axis of a rotating member 1 and fixed to the rotating member 1, a magnetic field detecting element 4 fixed to a fixed member 3 so as to be opposite to the permanent magnet 2 with a gap therebetween, and a signal processing circuit 5 processing a signal from the magnetic field detecting element 4. Here, multi-turn detecting means including a multi-turn magnetic field detecting element 6 and a multi-turn signal processing circuit 7 detecting an amount of multi-turn from a signal of the multi-turn magnetic field detecting element 6 is added thereto.

6 Claims, 5 Drawing Sheets

FOREIGN PATENT DOCUMENTS

| | | |
|---|---|---|
| DE | 4440214 A1 | 5/1996 |
| DE | 10346052 A1 | 4/2004 |
| JP | 6-62322 U | 9/1994 |
| JP | 2002-506530 A | 2/2002 |
| JP | 2002-228486 A | 8/2002 |
| WO | WO 99/13296 A1 | 3/1999 |

* cited by examiner

SMALL SIZE MAGNETIC ENCODER UNIT WITH LOW POWER CONSUMPTION

TECHNICAL FIELD

The present invention relates to a magnetic encoder unit for detecting a rotational position of a more used for an industrial robot, an NC machining tool, and the like, and more particularly, to a magnetic encoder unit for detecting an absolute angular position in not more than one-turn and an amount of multi-turn.

RELATED ART

In the past, a magnetic encoder unit for detecting an angle in not more than one-turn by detecting a magnetic field of a permanent magnet which is magnetized in a direction perpendicular to a rotation axis of a rotating member and which is fixed to the rotating member by the use of a magnetic field detecting element is disclosed (for example, see Patent Document 1).

Figure 8:
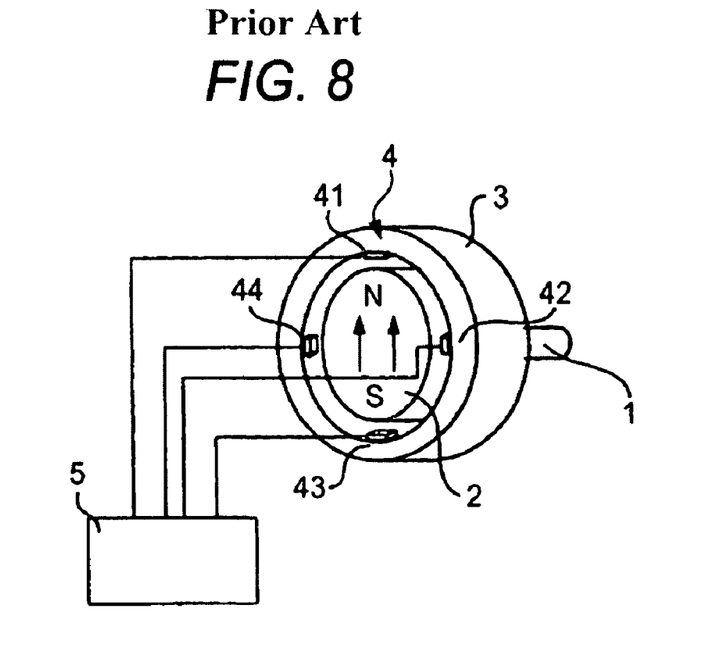
FIG. 8 is a perspective view illustrating a known magnetic encoder unit.

FIG. 8 is a perspective view illustrating a known magnetic encoder unit.

In FIG. 8, reference numeral 1 denotes a rotating member and reference numeral 2 denotes a permanent magnet constituting a disk-shaped magnetic field member fixed to an end of the rotating member 1, where the permanent magnet 2 is magnetized in a direction perpendicular to an axis direction of the rotating member 1. Reference numeral 3 is a ring-shaped fixed member disposed on the outer circumference of the permanent magnet 2 and reference numeral 4 denotes a magnetic field detecting element which is disposed in a circumferential direction of the fixed member 3 with a constant interval so as to be concentric with the rotation center of the rotating member 1, where the magnetic field detecting element includes four magnetic field detecting elements 41, 42, 43, and 44. The magnetic field detecting elements 4 are opposite to the outer circumferential surface of the permanent magnet 2 with a gap therebetween. An $A_1$ phase detecting element 41 and a $B_1$ phase detecting element 42 are disposed with a phase difference of 90° in an electrical angle therebetween. An $A_2$ phase detecting element 43 is disposed with a phase difference of 180° in an electrical angle from the $A_1$ phase detecting element 41 and a $B_2$ phase detecting element 44 is disposed with a phase difference of 180° in an electrical angle from the $B_1$ phase detecting element 42.

Figure 9:
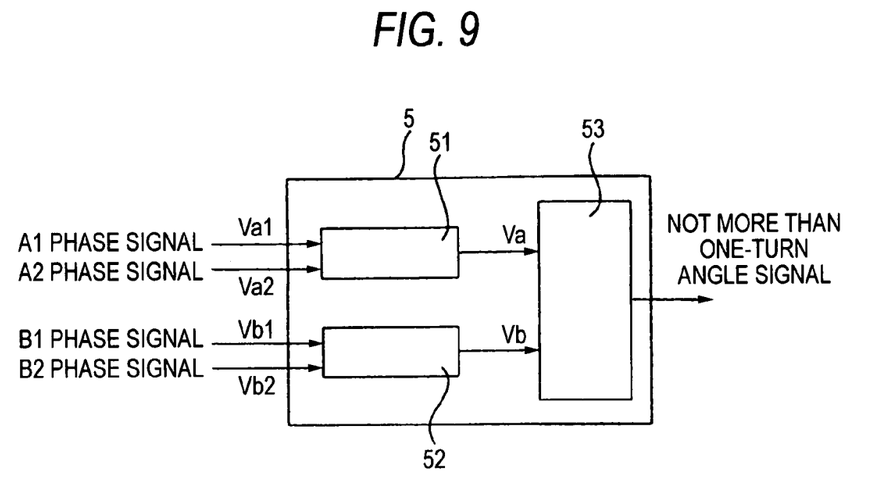
FIG. 9 is a block diagram illustrating a signal processing circuit of the known magnetic encoder unit.

FIG. 9 is a block diagram illustrating a signal processing circuit.

In FIG. 9, reference numeral 5 denotes a signal processing circuit, which includes differential amplifiers 51 and 52 and an angle calculating circuit 53.

Next, an operation will be described.

The permanent magnet 2 fixed to the rotating member 1 rotates with the rotation of the rotating member 1. The magnetic field detecting element 4 detects a magnetic field formed by the permanent magnet 2 outputs a sine-wave signal with one period about one-turn in a rotation angle. Such an encoder outputting a one-period signal in one-turn is called a 1X type encoder.

The differential amplifier 51 receives an A1 signal ($V_{a1}$) which is a detection signal from the $A_1$ phase detecting element 41 and an A2 signal ($V_{a2}$) which is a detection signal from the $A_2$ phase detecting element 43 and outputs a differential signal $V_a$ of both signals. The differential amplifier 52 receives an B1 signal ($V_{b1}$) which is a detection signal from the $B_1$ phase detecting element 42 and an B2 signal ($V_{b2}$) which is a detection signal from the $B_2$ phase detecting element 44 and outputs a differential signal $V_b$ of both signals. The differential signals $V_a$ and $V_b$ are different from each other by 90° in phase. The angle calculating circuit 53 calculates an operation of arctan ($V_a/V_b$) from the differential signals $V_a$ and $V_b$ to obtain the rotation angle.

In this way, the known 1X type encoder detects an angle in not more than one-turn, by detecting the magnetic field generated from the permanent magnet magnetized in one direction by the use of the magnetic field detecting element and calculating the angle by the use of the signal processing circuit.

Patent Document 1: Unexamined Japanese Patent Application Publication No. Hei10-541482

DISCLOSURE OF THE INVENTION

Problems to be Solved by the Invention

The known 1X type encoder does not have means for detecting multiple rotations and thus detects only an angle in not more than one-turn. In order to detect the amount of multi-turn, a multi-turn detecting circuit is added to the signal processing circuit of the known 1X type encoder and the signals from the magnetic field detecting element are input to the multi-turn detecting circuit, thereby detecting the amount of multi-turn. However, in order to retain information on the amount of multi-turn even with an intercept of an external power source such as an instantaneous power failure, it is necessary to continuously supply electric power to the magnetic field detecting element 4 and the added multi-turn detecting circuit by the use of a backup power source such as a battery. The power consumption at this time is required to be very small and proper current should be allowed to flow in the magnetic field detecting element 4 so as to obtain a not more than one-turn angle signal with high precision, thereby making it difficult to save power. Accordingly, when a battery is used as the backup power source, it is necessary to frequently interchange the batteries and it is difficult to apply the known 1X type encoder to mechanical apparatuses requiring a continuous operation for a long time with only a battery for the reason of maintenance thereof, thereby narrowing the allowable range of applications of the magnetic encoder unit.

It can be considered that mechanical means such as a gear is added so as to retain and detect the amount of multi-turn without using a backup power source. However, there are problems with increase in size and decrease in lifetime of the magnetic encoder unit due to a mechanical contact or decrease in reliability due to mechanical wear.

It is difficult to apply a small-sized damping mechanism using mechanical means such as gear to an outer rotor type motor.

The present invention is contrived to solve the above-mentioned problems. An advantage of the invention is to provide a magnetic encoder unit with a small size, a small thickness, and a long lifetime, which can detect an amount of multi-turn with low power consumption, can operate continuously for a long time only with a battery, and can detect an amount of multi-turn of an outer rotor type motor.

Means for Solving the Problems

In order to achieve the above-mentioned advantage, a magnetic encoder unit according to some aspects of the invention provides the following configurations.

An aspect of the disclosed invention is a magnetic encoder unit including:

a permanent magnet magnetized in a direction perpendicular to a rotation axis of a rotating member and fixed to the rotating member, a magnetic field detecting element fixed to a fixed member so as to be opposite to the permanent magnet with a gap therebetween, and a signal processing circuit processing a signal from the magnetic field detecting element, wherein the magnetic field detecting element includes at least two one-turn magnetic field detecting elements detecting an angle in not more than one-turn and at least two multi-turn magnetic field detecting elements detecting an amount of multi-turn, and the signal processing circuit includes a one-turn signal processing circuit generating a not more than one-turn angle signal from detection signals from the one-turn magnetic field detecting elements and a multi-turn signal processing circuit generating a multi-turn signal from detection signals of the multi-turn magnetic field detecting elements.

In a specific enhancement, the rotating member and the permanent magnet have a ring shape, a ring-shaped magnetic yoke is formed around the permanent magnet, and the fixed member is disposed inside the rotating member.

More specifically, the fixed member has a ring shape and is formed of a ferromagnetic substance.

In another specific enhancement, the multi-turn magnetic field detecting elements are one of a magnetic resistance element and a hall element.

In another specific enhancement, the multi-turn magnetic field detecting elements are disposed in the circumferential direction of the permanent magnet.

In another specific enhancement, the multi-turn magnetic field detecting elements are disposed on the side surface of the permanent magnet with a gap therebetween in the axis direction of the rotating member.

Advantages of the Invention

In an aspect of the present invention, the multi-turn detecting means includes the multi-turn magnetic field detecting elements and the multi-turn signal processing circuit is added independently of the not more than one-turn angle detecting means including the one-turn magnetic field detecting elements and the one-turn signal processing circuit. Accordingly, since backup power can be supplied to only the multi-turn detecting means at the time of intercept of an external power supply, it is possible to detect the amount of multi-turn with very small power and it is not thus necessary to frequently interchange a battery used as a backup power source, thereby making a continuous operation of a long time possible.

In an enhancement, since the rotating member and the permanent magnet have a ring shape and the fixed member is disposed inside the rotating member, it is possible to detect the amount of multi-turn of an outer rotor type motor with very small power.

In the specific enhancement, since the fixed member disposed inside the rotating member has a ring shape, it is possible to constitute a hollow magnetic encoder unit capable of detecting the amount of multi-turn.

In another enhancement, by using a magnetic resistance element or a hall element with a small size and low power consumption as the multi-turn magnetic field detecting element, a large increase in outer size even when a multi-turn function is added. Accordingly, even when the multi-turn function is added to a known magnetic encoder unit, the application to the unit is not limited in view of the outer size. Since no mechanical contact is provided, it is possible to embody a magnetic encoder unit with long lifetime and high reliability.

In another enhancement, since the multi-turn magnetic field detecting elements are disposed in the other space of the outer circumference of the permanent magnet in which the one-turn magnetic field detecting elements are disposed, it is possible to decrease the thickness and to decrease the thickness in the diameter direction.

In another enhancement, the multi-turn magnetic field detecting elements are disposed on the side surface of the permanent magnet 2 opposite to the rotating member 1. Accordingly, the multi-turn magnetic field detecting elements are not affected directly by radiant heat from a motor even when the motor is connected directly to the rotating member and it is possible to detect the amount of multi-turn with stability and high reliability even with small current.

DESCRIPTION OF REFERENCE NUMERALS AND SIGNS 1, 1': ROTATING MEMBER
2: PERMANENT MAGNET
2': MAGNETIC FIELD GENERATING ROTOR
21: RING-SHAPED PERMANENT MAGNET
22: RING-SHAPED MAGNETIC YOKE
3, 3': FIXED MEMBER
31: RING-SHAPED FIXED MEMBER
32: ELEMENT HOLDER
4: MAGNETIC FIELD DETECTING ELEMENT, ONE-TURN MAGNETIC FIELD DETECTING ELEMENT
  41: A1 PHASE DETECTING ELEMENT
  42: B1 PHASE DETECTING ELEMENT
  43: A2 PHASE DETECTING ELEMENT
  44: B2 PHASE DETECTING ELEMENT
5: SIGNAL PROCESSING CIRCUIT, ONE-TURN SIGNAL PROCESSING CIRCUIT
  51, 52: DIFFERENTIAL AMPLIFIER
  53: ANGLE CALCULATING CIRCUIT
6: MULTI-TURN MAGNETIC FIELD DETECTING ELEMENT
  61: Am PHASE DETECTING ELEMENT 62: Bm PHASE DETECTING ELEMENT
7: MULTI-TURN SIGNAL PROCESSING CIRCUIT
71, 72: AMPLIFIER
73: COUNTER

BEST MODE FOR CARRYING OUT THE INVENTION

Hereinafter, embodiments of the invention will be described with reference to the drawings.

FIRST EMBODIMENT

Figure 1:
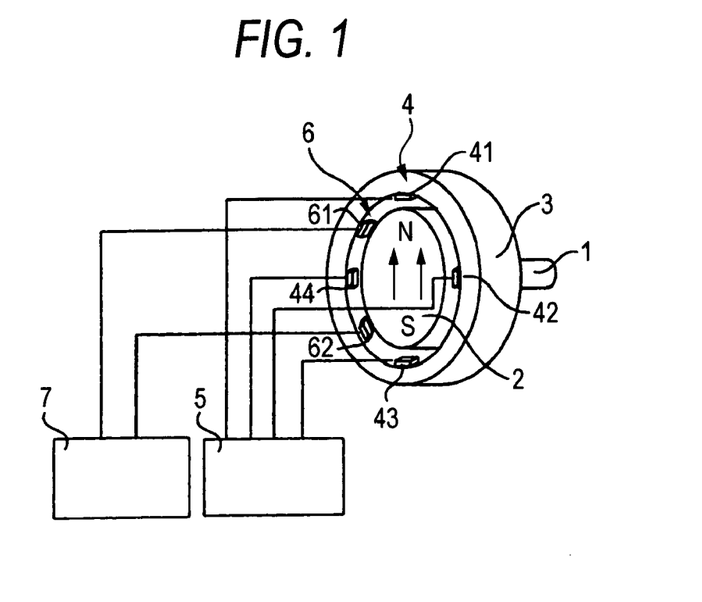
FIG. 1 is perspective view illustrating a magnetic encoder unit according to a first embodiment of the invention.

FIG. 1 is a perspective view illustrating a magnetic encoder unit according to a first embodiment of the invention.

In FIG. 1, reference numeral 1 denotes a rotating member, reference numeral 2 denotes a permanent magnet, reference numeral 3 denotes a fixed member, reference numeral 4 denotes a one-turn magnetic field detecting element, reference numeral 5 denotes a one-turn signal processing circuit, reference numeral 6 denotes a multi-turn magnetic field detecting element, and reference numeral 7 denotes a multi-turn signal processing circuit. The configurations of the rotating member 1, the permanent magnet 2, the fixed member 3, the one-turn magnetic field detecting element 4, and the one-turn signal processing circuit 5 are similar to those of the known magnetic encoder unit and thus description thereof will be omitted.

In this embodiment, the permanent magnet 2 is formed of a ferrite magnet and includes two poles magnetized parallel to a direction perpendicular to the rotation axis of the rotating member 1. The diameter of the permanent magnet 2 is about 3 mm and the thickness thereof is about 1 mm.

The multi-turn magnetic field detecting element 6 includes two magnetic resistance elements of an Am phase detecting element 61 and a Bm phase detecting element, which are disposed on the outer circumferential surface of the permanent magnet 2 on a disk with a gap therebetween and are different from each other by about 90° in phase of an electrical angle.

Since the Am phase and the Bm phase determine a rotation direction, the Am phase and the Bm phase may be phase angles in the range not affecting the order of generation of a Vam signal and a Vbm signal due to chattering of both signals. The Am phase detecting element 61 and the Bm phase detecting element 62 may be located at positions different from each other by 10° to 170° in an electrical angle.

The multi-turn signal processing circuit 7 processes the Am phase signal and the Bm phase signal detected by the multi-turn magnetic field detecting element 6 to generate a multi-turn signal.

Figure 2:
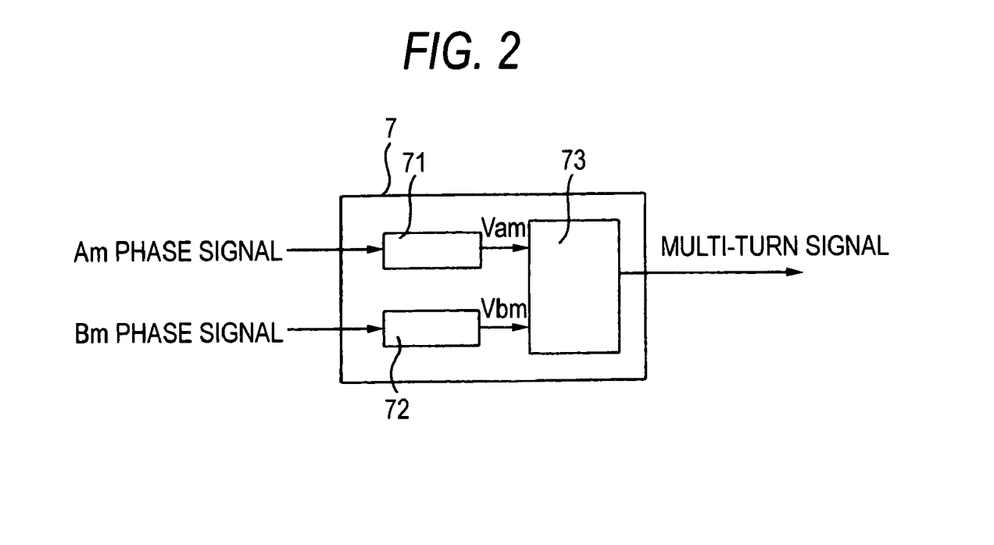
FIG. 2 is a block diagram illustrating a multi-turn signal processing circuit of the magnetic encoder unit according to the first embodiment of the invention.

FIG. 2 is a block diagram illustrating the multi-turn signal processing circuit.

In FIG. 2, reference numerals 71 and 72 denote amplifiers and reference numeral 73 denotes a counter.

This embodiment is different from the known art in that it includes the multi-turn magnetic field detecting element 6 and the multi-turn signal processing circuit 7.

Next, an operation of the first embodiment of the invention will be described.

The detection of an angle in not more than one-turn is similar to the known art and thus only the detection of the amount of multi-turn will be described.

When the permanent magnet 2 rotates with the rotation of the rotating member 1, a magnetic flux density of the gap varies. The variation of the magnetic flux density is detected by the multi-turn magnetic field detecting element 6 and is input to the multi-turn signal processing circuit 7. The signal detected by the Am phase detecting element 61 of the multi-turn magnetic field detecting element 6 is amplified to the signal Vam by the amplifier 71 and then is input to the counter 73. The signal detected by the Bm phase detecting element 61 is amplified to the signal Vbm by the amplifier 72 and then is input to the counter 73. The counter 73 counts Vam and Vbm to generate a multi-turn signal.

Figure 3:
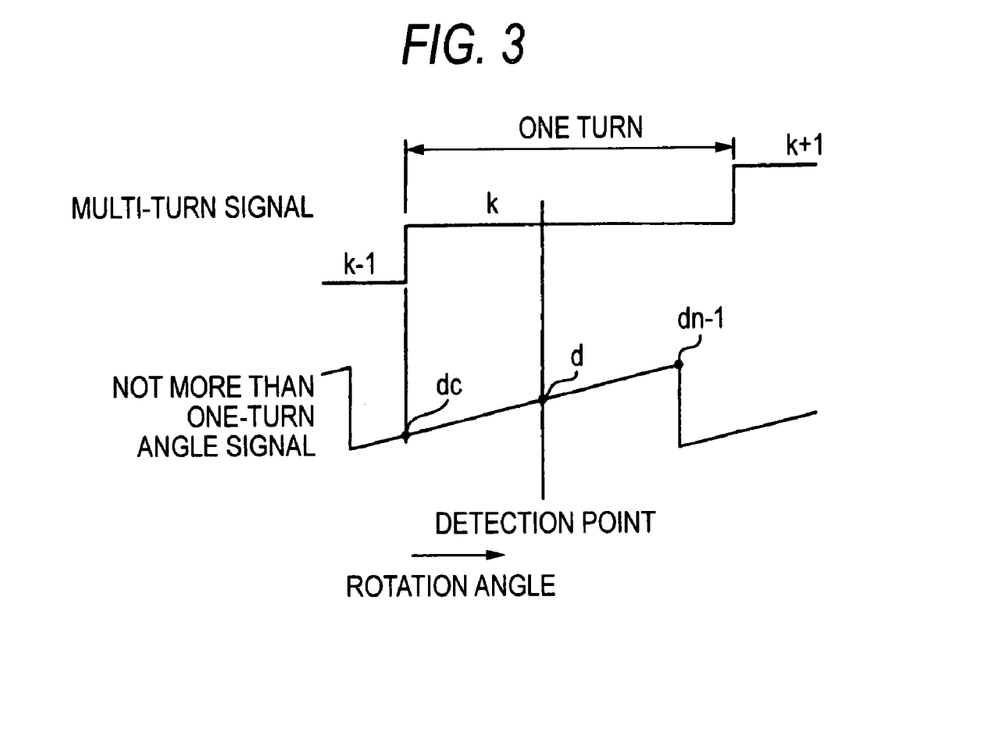
FIG. 3 is an operational diagram illustrating a relation between a multi-turn signal and a not more than one-turn angle signal.

FIG. 3 is an operational diagram illustrating a relation between a multi-turn signal and a not more than one-turn angle signal.

In FIG. 3, the not more than one-turn angle signal is an angle signal varying from 0 to (dn−1) with turn of the rotating member 1 when a resolution of the signal is dn. An angle signal including the amount of multi-turn at a detection point can be obtained by storing in advance data dc of the not more than one-turn angle signal when the multi-turn signal varies, adding $\{(d-dc)/dn\}$ to the multi-turn signal k when the data d of the not more than one-turn angle signal at the detection point is greater than dc, and adding $\{(d+dn-dc)/dn\}$ to the multi-turn signal k when d is less than dc.

When an external power source is intercepted due to an instantaneous power failure or the like, the multi-turn magnetic field detecting element 6 and the multi-turn signal processing circuit 7 are supplied with power from a battery, retain the multi-turn data, and continuously detect the amount of multi-turn. Since the detection of the amount of multi-turn does not require detection precision higher than the not more than one-turn angle signal, the amount of multi-turn can be detected with small power. At this time, the magnetic field detecting element 4 and the signal processing circuit 5 are not supplied with the power and thus the not more than one-turn angle signal cannot be detected. However, in the 1X type encoder, even when the external power source is intercepted due to an instantaneous power failure or the like, the not more than one-turn angle signal can be reproduced from the detection signal of the one-turn magnetic field detecting element 4 after the power is restored.

In this embodiment, by additionally providing multi-turn detecting means including the multi-turn magnetic field detecting element 6 and the multi-turn signal processing circuit 7 independently of the not more than one-turn angle detecting means including the one-turn magnetic field detecting element 4 and the one-turn signal processing circuit 5 and supplying backup power to only the multi-turn detecting means with low power consumption at the time of intercepting the external power source, it is possible to detect the amount of multi-turn with very small power. In this embodiment, the power consumption of the backup power source can be reduced to about 0.3 mW. This value is about 1/500 of the power consumption when the amount of multi-turn is detected by adding a multi-turn detecting circuit to the known magnetic encoder unit and sharing the signal of the magnetic field detecting element.

As the magnetic field detecting element for detecting the amount of multi-turn without adding a particular multi-turn detecting mechanism, the multi-turn magnetic resistance element 6 having a small size and small power consumption is disposed in the gap on the same circumference as the one-turn magnetic detecting element 4. Accordingly, the sizes in the axis direction and the diameter direction of the rotating axis are not increased, thereby embodying a small-sized structure.

Accordingly, it is possible to a magnetic encoder unit which is applicable to a variety of fields.

Although the ferrite magnet is used as the permanent magnet in this embodiment, the permanent magnet may be formed of Sm—Co magnets or Ne—Fe—B magnets, or a dispersion type complex magnet in which a variety of magnets are coupled with a polymer material.

Signals are adjusted by using the amplifiers 71 and 72 in the multi-turn signal processing circuit 7. The same effect is obviously obtained even by using a comparator. The comparator may be disposed in the vicinity of the magnetic field detecting element 6 instead of the multi-turn signal processing circuit 7. In this case, since the signal binarized which is an output signal of the comparator is set to the multi-turn signal processing circuit 7, it is possible to enhance noise resistance.

SECOND EMBODIMENT

Figure 4:
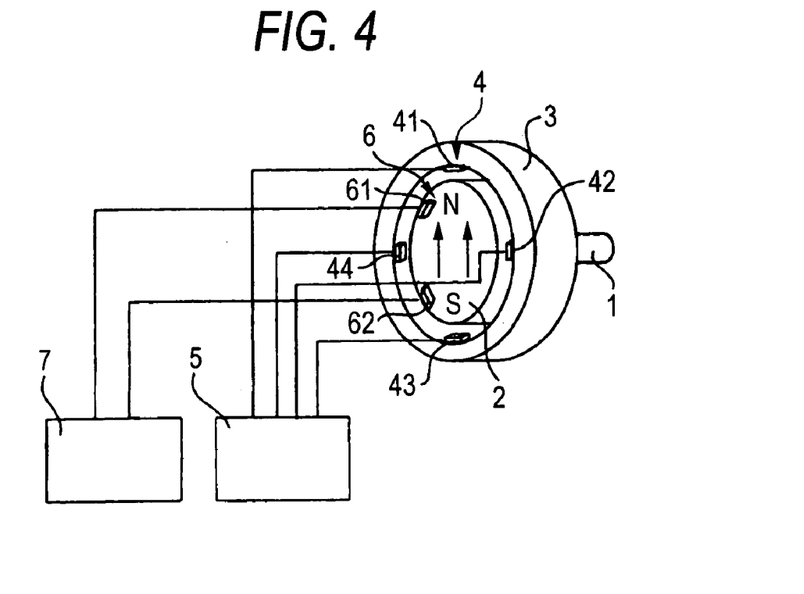
FIG. 4 is perspective view illustrating a magnetic encoder unit according to a second embodiment of the invention.

FIG. 4 is a perspective view illustrating a magnetic encoder unit according to a second embodiment of the invention.

This embodiment is different from the first embodiment, in that the multi-turn magnetic field detecting element 6 of the first embodiment is disposed on the outer circumferential surface of the disk-shaped permanent magnet with a gap therebetween, but the multi-turn magnetic field detecting element is disposed on the plane of the disk-shaped permanent magnet 2. The multi-turn magnetic detecting element is disposed on the plane opposite to the plane to which the rotating member 1 is fixed.

The multi-turn magnetic field detecting element 6 includes two hall elements of an Am phase detecting element 61 and a Bm phase detecting element 62, which are fixed to the fixed member 3 by a fixing jig not shown so as to be different from each other by about 90° in phase in the rotation direction of the rotating member 1. The gap between the surface of the permanent magnet 2 and the multi-turn magnetic field detecting element is about 1 mm.

An operation of this embodiment is similar to that of the first embodiment and thus description thereof is omitted.

In this embodiment, the multi-turn magnetic field detecting element 6 is disposed on a disk plane of the permanent magnet 2 opposite to the rotating member 1 with a gap therebetween. Accordingly, when a motor not shown is connected directly to the rotating member 1, the multi-turn magnetic field detecting element does not receive radiant heat from the motor, thereby stably detecting a magnetic field with small current consumption.

In this embodiment, similarly to the first embodiment, by adding the multi-turn detecting circuit to the signal processing circuit of the known magnetic encoder unit and sharing the signal of the not more than one-turn magnetic field detecting element, the power consumption can be reduced to about 1/500 of that of the detecting the amount of multi-turn. Accordingly, it is possible to remarkably increase the interval for interchanging a battery when the battery is used as a backup power source.

THIRD EMBODIMENT

Figure 5:
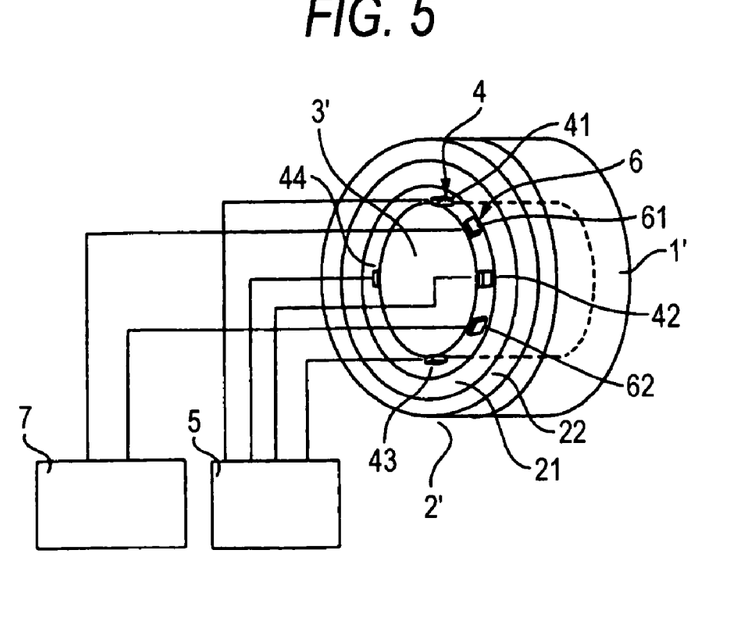
FIG. 5 is perspective view illustrating a magnetic encoder unit according to a third embodiment of the invention.

FIG. 5 is a perspective view illustrating a magnetic encoder unit according to a third embodiment of the invention.

In FIG. 5, reference numeral 1' denotes a rotating member, reference numeral 2' denotes a magnetic field generating rotor, and reference numeral 3' denotes a fixed member. Reference numeral 21 denotes a ring-shaped permanent magnet, reference numeral 22 denotes a ring-shaped magnetic yoke which is disposed on the outer circumference of the ring-shaped permanent magnet 21 and formed of a magnetic material. The magnetic field generating rotor 2' includes the ring-shaped permanent magnet 21 and the ring-shaped magnetic field yoke 22. Reference numeral 4 denotes four one-turn magnetic field detecting elements which are fixed to the fixed member 3' to be opposite to the ring-shaped permanent magnet 21 with a gap therebetween and which detects a position in not more than one-turn, reference numeral 5 denotes a one-turn signal processing circuit processing signals from the magnetic field detecting elements 4, and reference numeral 6 denotes two multi-turn magnetic field detecting elements fixed to the fixed member 3' to be opposite to the ring-shaped permanent magnet 2 with a gap therebetween.

The ring-shaped permanent magnet 21 is formed of a ferrite magnet and has two poles magnetized in a direction parallel to the direction perpendicular to the axis of the rotating member 1. The ring-shaped yoke 22 is formed of a ferromagnetic substance such as carbon steel. The magnetic field generating rotor 22 serves to reduce the magnetic resistance to concentrate a magnetic field to the one-turn magnetic field detecting element 4 and the multi-turn magnetic field detecting element 6, thereby enhancing the SN ratio of the magnetic field detecting elements. The magnetic field generating rotor serves to intercept external magnetic noises. The material thereof may be a ferromagnetic substance such as carbon steel.

The one-turn magnetic field detecting element 4 includes four hall effect elements, which are opposite to the inner circumferential surface of the permanent magnet 21 with a gap therebetween. An A1 phase detecting element 41 and a B1 phase detecting element 42 are disposed with a phase difference of 90° in an electrical angle therebetween. An A2 phase detecting element 43 is disposed with a phase difference of 180° in an electrical angle from the A1 phase detecting element 41 and a B2 phase detecting element 44 is disposed with a phase difference of 180° in an electrical angle from the B1 phase detecting element 42.

The multi-turn magnetic field detecting element 6 includes magnetic resistance elements, which are opposite to the magnetic field generating rotor 2' with a gap therebetween in the diameter direction of the rotating member 1. An Am phase detecting element 61 and a Bm phase detecting element 62 are disposed with a phase difference of 90° in an electrical angle therebetween.

The configurations of the one-turn signal processing circuit 5 and the multi-turn signal processing circuit 7 are similar to those of the first embodiment and thus description thereof is omitted.

This embodiment is different from the first embodiment, in that the permanent magnet fixed to the rotating member is formed in a ring shape, a ring-shaped magnetic yoke is formed around the permanent magnet, and the one-turn magnetic field detecting element 4 and the multi-turn magnetic field detecting element 6 are disposed to the fixed member disposed inside the rotating member.

Next, an operation is described. The magnetic field generating rotor 2' rotates with the rotation of the rotating member 1'. The magnetic field generated from the magnetic field generating rotor 2' is detected by the one-turn magnetic field detecting element 4 and then is converted into a not more than one-turn angle signal by the one-turn signal processing circuit 5. The magnetic field generated from the magnetic field generating rotor 2' is detected by the multi-turn magnetic field detecting element 6 and is converted into a multi-turn signal by the multi-turn signal processing circuit 7. The methods of generating the not more than one-turn angle signal and the multi-turn signal are similar to the first embodiment and description thereof is omitted.

In this embodiment, since the sizes in the axis direction and the diameter direction of the rotating member are not increased due to the addition of a multi-turn amount detecting function, it is possible to retain the small-sized structure and to detect the amount of multi-turn of an outer rotor type rotating member with very small power.

Since it is possible to obtain a small size (about 2.5×1.5× 0.6 mm) and a strong output signal by using the hall element as the magnetic field detecting element, noise resistance is excellent. Since the hall element has a small size, the thickness in the width direction of the rotating member can be reduced. In addition, since the thickness in the diameter can be reduced, the hollow diameter can be increased to obtain the optimum structure in hollow shape.

Although the ferrite magnet is used as the ring-shaped permanent magnet in this embodiment, the permanent magnet may be formed of Sm—Co magnets or Ne—Fe—B magnets, or a dispersion type complex magnet in which a variety of magnets are coupled with a polymer material.

FOURTH EMBODIMENT

Figure 6:
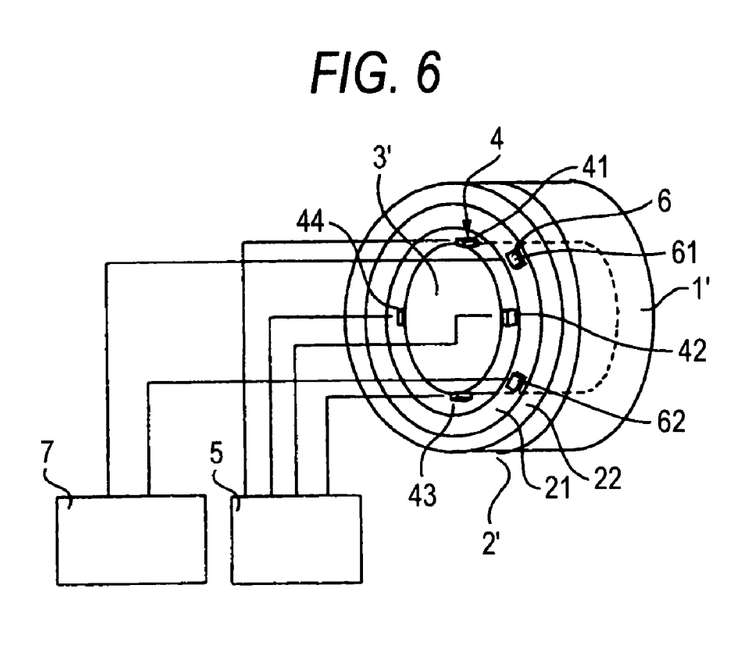
FIG. 6 is perspective view illustrating a magnetic encoder unit according to a fourth embodiment of the invention.

FIG. 6 is a perspective view illustrating a magnetic encoder unit according to a fourth embodiment of the invention.

This embodiment is different from the third embodiment, in that the multi-turn magnetic field detecting element 6 is disposed on the outer circumferential surface of the fixed member 3' in the third embodiment, while the multi-turn magnetic field detecting element 6 is fixed to the fixed member 3' by a fixing jig not shown so as to be opposite to the side surface of the magnetic field generating rotor 2' with a gap therebetween in the axis direction of the rotating member 1'.

An operation of this embodiment is similar to that of the third embodiment and description thereof is omitted.

In this embodiment, it is possible to detect the amount of multi-turn of an outer rotor type motor with very small power and the multi-turn magnetic field detecting element 6 is disposed on the plane of the magnetic field generating rotor opposite to the rotating member 11 with a gap therebetween. Accordingly, similarly to the second embodiment, when a motor not shown is connected directly to the rotating member 1', the multi-turn magnetic field detecting element is not affected by the radiant heat from the motor, thereby stably detecting the magnetic field with small current consumption.

FIFTH EMBODIMENT

Figure 7:
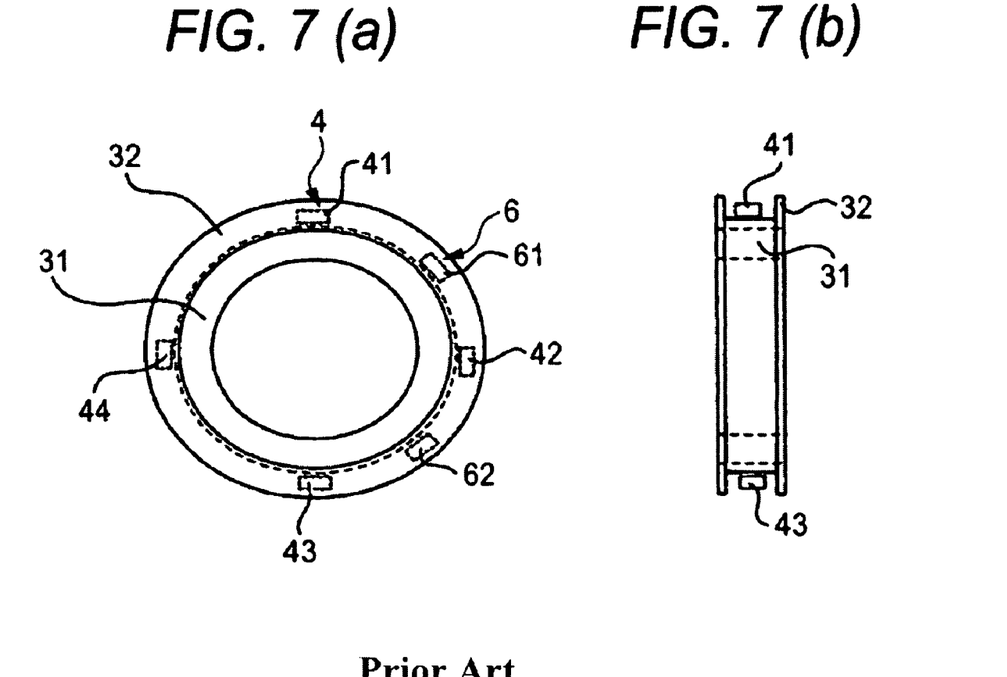
FIG. 7 is perspective view illustrating a magnetic encoder unit according to a fifth embodiment of the invention.

FIG. 7 is a diagram illustrating a configuration of a fixed member according to a fifth embodiment of the invention.

In FIG. 7, reference numeral 31 denotes a ring-shaped fixed member and reference numeral 32 denotes an element holder. This embodiment is different from the third embodiment, in that the fixed member has a ring shape. Accordingly, it is possible to detect an amount of multi-turn of an outer rotor type motor having a hallow structure. The ring-shaped fixed member 31 is formed of a ferromagnetic substance (for example, carbon steel). Accordingly, the magnetic resistance can be reduced similarly to the ring-shaped magnetic yoke 22 of the third embodiment to concentrate a magnetic field on the one-turn magnetic field detecting element 4 detecting a position in not more than one-turn and the multi-turn magnetic field detecting element 6. In addition, it is possible to enhance the SN ratio of the detection signal and to intercept external magnetic noises. The element holders formed of a non-magnetic substance are disposed between the ring-shaped fixed member 31, the one-turn magnetic field detecting element 4, and the multi-turn magnetic field detecting element 6. Thanks to the element holder, it is easy to detect a position of the magnetic field detecting element and to enhance positional precision.

The operation of this embodiment is similar to that of the third embodiment and description thereof is omitted.

As described above, according to this embodiment, it is possible to detect the amount of multi-turn of the outer rotor type motor having a hallow structure with very small power.

INDUSTRIAL APPLICABILITY

According to the invention, since the amount of multi-turn can be detected with a small size and very low power consumption, the invention is applicable to a small-sized servo motor requiring for detecting an absolute position.

The invention claimed is:

1. A magnetic encoder unit comprising:
 a permanent magnet magnetized in a direction perpendicular to a rotation axis of a rotating member and fixed to the rotating member,
 a magnetic field detecting element fixed to a fixed member so as to be opposite to the permanent magnet with a gap therebetween, and
 a signal processing circuit processing a signal from the magnetic field detecting element, wherein
 the magnetic field detecting element includes at least two one-turn magnetic field detecting elements detecting an angle in not more than one-turn and at least two multi-turn magnetic field detecting elements detecting an amount of multi-turn, and
 the signal processing circuit includes a one-turn signal processing circuit generating a not more than one-turn angle signal from detection signals from the one-turn magnetic field detecting elements and a multi-turn signal processing circuit generating a multi-turn signal from detection signals of the multi-turn magnetic field detecting elements.

2. The magnetic encoder unit according to claim 1, wherein the permanent magnet has a ring shape,
 a ring-shaped magnetic yoke is formed around the permanent magnet, and
 the fixed member is disposed inside the rotating member.

3. The magnetic encoder unit according to claim 2, wherein the fixed member has a ring shape and is formed of a ferromagnetic substance.

4. The magnetic encoder unit according to claim 1, wherein the multi-turn magnetic field detecting elements are one of a magnetic resistance element and a hall element.

5. The magnetic encoder unit according to claim 1, wherein the multi-turn magnetic field detecting elements are disposed in the circumferential direction of the permanent magnet.

6. The magnetic encoder unit according to claim 1, wherein the multi-turn magnetic field detecting elements are disposed on the side surface of the permanent magnet with a gap therebetween in the axis direction of the rotating member.

* * * * *